Oct. 5, 1937.  K. JOHNSON  2,094,795
SOLDERING TOOL
Filed June 19, 1936
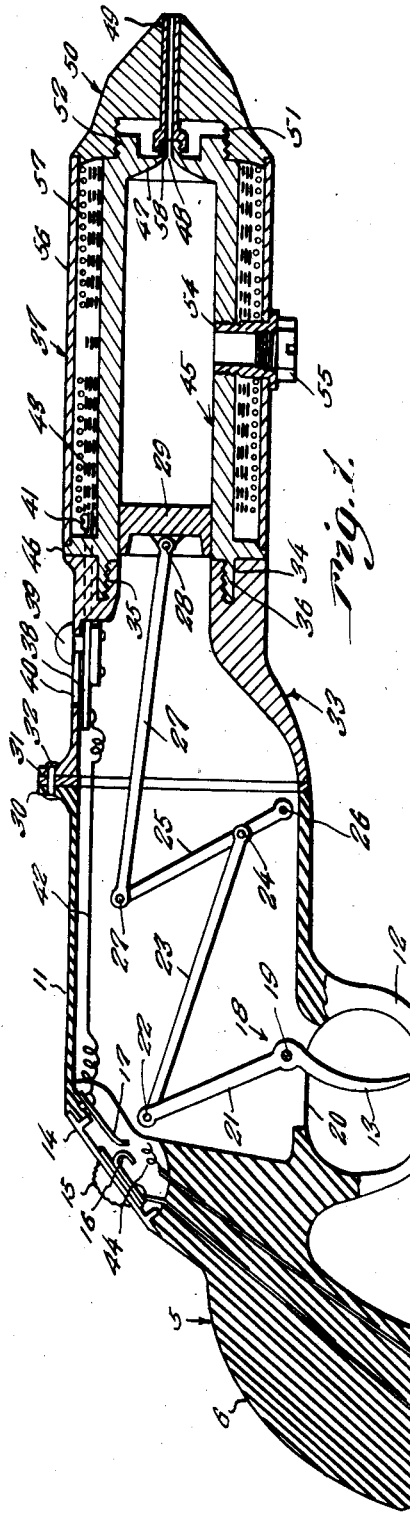
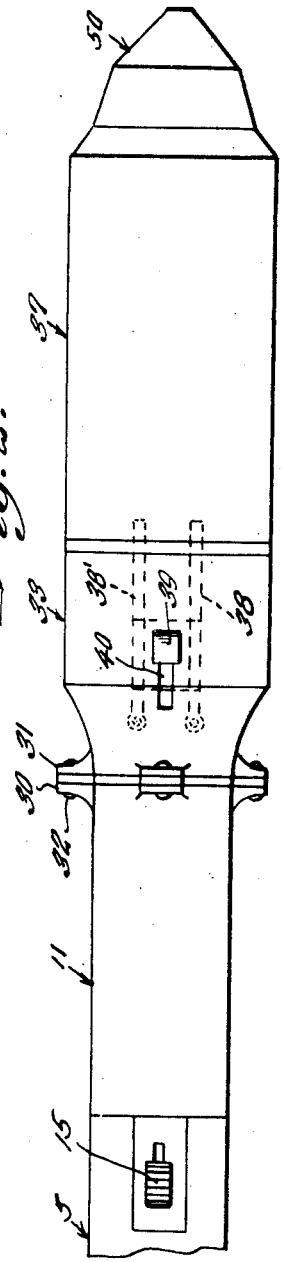
Inventor
Kent Johnson
By Clarence A. O'Brien
Hyman Berman
Attorneys Patented Oct. 5, 1937

2,094,795

UNITED STATES PATENT OFFICE 2,094,795

SOLDERING TOOL

Kent Johnson, Kansas City, Kans.

Application June 19, 1936, Serial No. 86,191

3 Claims. (Cl. 219—27)

My invention relates generally to soldering tools, and particularly to a soldering tool having a solder magazine and means for controllably feeding the solder to soldering position on the tool, and an important object of my invention is to provide a soldering tool of the character indicated which can be easily held and operated in one hand so as to leave the other hand free to hold or direct the work.

Another important object of my invention is to provide a soldering tool of the character indicated which prevents the waste of solder and the application of solder in the wrong places, which tool is light and well balanced so as to enable working therewith over long periods of time without fatiguing the operator.

Another important object of my invention is to provide a soldering tool of the character indicated above in which the heating elements can be readily serviced by any electrician, and which involves a thumb switch which eliminates the necessity of removing the plug from the wall connection or a distant switch to cut off the heating elements.

Other important objects of my invention will be apparent from a reading of the following description taken in connection with the drawing, wherein for purposes of illustration I have shown a preferred embodiment of my invention.

In the drawing:—

Figure 1 is a general longitudinal sectional view taken through an embodiment of the invention.

Figure 2 is a top plan view of Figure 1.

Referring in detail to the drawing, the numeral 5 generally designates a pistol grip section which is preferably made of bakelite or similar material which is non-conductive of heat and which assumes the form of a pistol grip 6 in the butt of which are the openings 7 and 8 accommodating the plug contacts 9 and 10. On the pistol grip 6 is the pistol body portion 11 which is hollow and has depending therefrom the trigger guard 12 in which the tongue 13 of the trigger depends for operation by the operator. In the position on the pistol body usually occupied by the hammer of a pistol, is arranged the thumb switch 14 which includes the roughened member 15 to be engaged by the thumb of the operator while grasping the pistol grip 6 for sliding the contact element 16 into engagement with the contact element 17 to close the circuit to the heating element to be described.

The trigger 18 includes the tongue 13 which is pivoted at its upper end as indicated by the numeral 19 in the opening 20 in the lower part of the pistol body 11 and the vertical rod portion 21 which has pivoted to its upper end as indicated by the numeral 22 the forwardly declining connecting link 23 which has its forward end pivoted as indicated by the numeral 24 to an intermediate point in the backwardly leaning straight rod 25 which is pivoted in the interior of the pistol body 11 at its lower end as indicated by the numeral 26 and pivoted at its upper end as indicated by the numeral 27 to the rear end of the connecting rod 27 which is pivotally connected as indicated by the numeral 28 to the piston 29 which in Figure 1 is shown in a fully retracted position in the solder barrel.

Fastened by means of flanges 30 and 31 and bolts or rivets 32 to the front end of the pistol body 11 is the intermediate metallic section 33 which is preferably formed of materials such as duralumin and which is formed in its front end with an axial annular groove 34 which has its radially inward side threaded as indicated by the numeral 35 for reception of the interiorly threaded annulus 36 on the rear end of the soldering head section which is generally designated 37. Preventing rotation of the sections 33 and 37 when the same are in fully connected positions is the bar 38 which has thereon an operating knob 39, sliding in an opening 40 in the top of the section 33. The rod 38 must be retracted rearwardly so that its front end ordinarily secured to the section 37 by the screw 41 clears the inner end of the soldering head 37, by pushing on the operating knob 39 after removing the screw 41. The heating element wire 43 which leads to the contact element 17 is connected to the rod 38 and the screw 41 connects the rear end of the hollow cylindrical heating element 43 with the front end of the rod 38 while the remaining wire 44 is connected to opposite end of the heating element 43.

The soldering head 37 comprises the solder reservoir 45 which is of suitable metal such as duralumin so as to have the same co-efficient of expansion as the intermediate section 33. The reservoir is hollow cylindrical in form and has on its inner end the annulus 36 already described, and on its rear end the laterally projecting flange 46 which forms one end of the heating element chamber. The rear end of the reservoir 45 is open and in the reservoir slides the solder feeding piston 29. The front end of the solder reservoir is closed except for the conical formation 47 which leads into a small axial passage 48 which communicates with the needle 49 in the soldering tip 50.

The soldering tip is conical in form and is formed of suitable heat conductive metal and is provided at its axially inward end with a threaded socket 51 which rests on the axially projecting annular flange 52 on the front end of the reservoir 45. Suitable wrench receiving formations may be provided on the tip 50 enabling easily removing the same. The sides of the tip project beyond the sides of the reservoir 45 so as to constitute the front end boundary of the heating element chamber.

A tubular stud 54 is threaded in an opening in the bottom of the chamber 45 and projects out through the side of the head and is provided with a filling plug 55 which is removable for the purpose of introducing solder into the interior of the reservoir. The stud 54 also acts to hold in place on the reservoir the exterior heat resisting metal sleeve 56 which forms the radially outward boundary of the heating element chamber and confines in place therein the exterior helical coils 57 of heat absorbing wire which surrounds the heating element 43 which is suitably arranged in substantially direct contact with the exterior of the reservoir 45 and along its entire length.

The arrangement of the reservoir and the piston provide that practically the entire interior of the reservoir may be filled with solder which melts upon introduction through the stud 54, so that a relatively large quantity of solder may be present in the reservoir and under the control of the operator at all times.

When the heating element 43 has been on for a sufficient length of time to heat up the reservoir and melt the solder therein and heat the soldering tip 50, the solder is fed through the needle 49, which is of suitable non-oxidizing material; and readily replaceable by threading the same off the tip 58 on which it is threaded after having removed the tip 50; the operator simply works the tongue 13 of the trigger while grasping the pistol grip 6 to cause the necessary amount of solder to come through the needle 49 onto the work, as the soldering tip 50 is applied to the work in the act of soldering.

Although I have shown and described herein a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claims.

What is claimed is:—

1. A soldering tool of the character described, said soldering tool comprising a soldering head including a removable soldering tip, a solder reservoir, a heating element surrounding the solder reservoir and having an electric circuit connected thereto, a solder discharge orifice on the reservoir, a detachable needle on said orifice and in communication therewith and extending through the soldering tip, and a manually controllable piston in said reservoir for controllably discharging solder through said needle, a handle section including a switch operatively connected to said heating element, an intermediate section lying between and detachably connecting the handle section and the soldering head and locking means securing the intermediate section against accidental displacement, said locking means also controlling the circuit for said heating element to electrically connect the heating element when the locking means is moved into a locking position.

2. A soldering tool of the character described, said soldering tool comprising a soldering head including a removable soldering tip, a solder reservoir, a heating element surrounding the solder reservoir and having an electric circuit connected thereto, a solder discharge orifice on the reservoir, a detachable needle on said orifice and in communication therewith and extending through the soldering tip, and a manually controllable piston in said reservoir for controllably discharging solder through said needle, a handle section including a switch operatively connected to said heating element, an intermediate section lying between and detachably connecting the handle section and the soldering head and locking means securing the intermediate section against accidental displacement, said locking means also controlling the circuit for said heating element to electrically connect the heating element when the locking means is moved into a locking position, and trigger mechanism mounted in the handle section and including a trigger tongue exposed for operation by the operator, said trigger mechanism being operatively connected to said piston.

3. A soldering tool comprising an apertured soldering head, a solder reservoir, an element for heating the reservoir, said element having an electric circuit connected therewith, a piston movable in the reservoir, trigger operated means for moving said piston, a handle equipped with a switch operatively connected to said heating element, an intermediate portion disposed between and detachably connecting the handle section and the reservoir, and locking means securing said intermediate portion against accidental displacement, said locking means also controlling the circuit for said heating element to electrically connect the heating element when the locking means is moved to locking position.

KENT JOHNSON.